US008609251B2

(12) United States Patent
Ohtsuki et al.

(10) Patent No.: US 8,609,251 B2
(45) Date of Patent: *Dec. 17, 2013

(54) RUBBER COMPOSITE AND RUBBER COMPOSITION

(75) Inventors: Masashi Ohtsuki, Koganei (JP); Yoshitaka Sato, Higashiyamato (JP)

(73) Assignee: Bridgestone Corporation, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 13/001,384

(22) PCT Filed: Sep. 11, 2009

(86) PCT No.: PCT/JP2009/065928
§ 371 (c)(1),
(2), (4) Date: Feb. 9, 2011

(87) PCT Pub. No.: WO2010/150419
PCT Pub. Date: Dec. 29, 2010

(65) Prior Publication Data
US 2012/0141810 A1 Jun. 7, 2012

(30) Foreign Application Priority Data

Jun. 26, 2009 (JP) ................. 2009-152722

(51) Int. Cl.
*C08K 5/44* (2006.01)
*C08J 3/24* (2006.01)
*C08C 19/20* (2006.01)
*C08L 7/00* (2006.01)
*C08L 9/00* (2006.01)

(52) U.S. Cl.
USPC ........... 428/461; 428/462; 428/465; 428/500; 428/521; 525/331.9; 525/332.7; 525/333.1; 525/333.2; 525/349

(58) Field of Classification Search
USPC .......... 428/461, 462, 465, 500, 521; 525/331.9, 332.7, 333.1, 333.2, 349
See application file for complete search history.

(56) References Cited

U.S. PATENT DOCUMENTS

2008/0026244 A1 * 1/2008 Barbotin et al. ............. 428/625
2011/0034638 A1 * 2/2011 Satou ........................... 525/349

FOREIGN PATENT DOCUMENTS

| JP | 2005-139082 A | | 6/2005 |
| JP | 2005-139239 A | | 6/2005 |
| JP | 2009-007408 | * | 1/2009 |
| JP | 2009-007408 A | | 1/2009 |
| WO | 2009/084617 A1 | | 7/2009 |
| WO | WO 2009/084617 A1 | * | 7/2009 |
| WO | 2009/110501 A1 | | 9/2009 |

* cited by examiner

*Primary Examiner* — Roberto Rabago
(74) *Attorney, Agent, or Firm* — Sughrue Mion, PLLC

(57) ABSTRACT

The rubber composite was fabricated by use of direct vulcanization adhesion method with a sulfenamide-based vulcanization accelerators, and the sulfenamide-based vulcanization accelerator is used for a rubber composite using a sulfenamide compound as a vulcanization accelerator, the adhesion properties of the steel cord/rubber adhesion boundary surface and the anti-scorch properties can be achieved simultaneously, the sulfenamide-based vulcanization accelerator being such that the bond order between an amine generated form the sulfenamide compound and a surface of a metal material is zero, and the distance of the S—N (amine moiety) bond of the sulfenamide compound is less than 1.67 Å, and the electric charge on N of the amine radical generated as a result of dissociation of the S—N bond is −0.295 or less.

3 Claims, 4 Drawing Sheets

(a)

(b)

RUBBER COMPOSITE AND RUBBER COMPOSITION

This application is a National Stage of International Application No. PCT/JP2009/065928 filed Sep. 11, 2009, claiming priority based on Japanese Patent Application No. 2009-152722 filed Jun. 26, 2009, the contents of all of which are incorporated herein by reference in their entirety.

TECHNICAL FIELD

The present invention relates to a composite of a metal material and a rubber composition vulcanized by use of a sulfenamide-based vulcanization accelerator, and also to a rubber composition vulcanized by use of a sulfenamide-based vulcanization accelerator.

BACKGROUND ART

In conventional rubber products, such as automobile tires, conveyor belts, and hoses, which are required to have high strength and high durability, the rubber is reinforced with metal materials such as steel cords. As a method for manufacturing such composites of rubber with metal materials, a method called direct vulcanization adhesion method has been known in which vulcanization of rubber and adhesive bonding between a metal material and the rubber are simultaneously performed.

For example, in manufacturing an automobile tire, kneaded rubber is formed by adding carbon black, a vulcanizing agent, and the like to masticated rubber, and then mixing them with each other. Thereafter, a vulcanization treatment is performed on the kneaded rubber. In the vulcanization treatment, a vulcanization accelerator is used to accelerate the rate of the vulcanization reaction.

When, however, the effect of accelerating the vulcanization reaction is too high, there is a concern that an initial-stage vulcanization reaction may proceed during storage before the vulcanization treatment or during operations before the vulcanization treatment (the proceeding of the reaction being called scorch). For this reason, the rate of the vulcanization reaction is adjusted by using a vulcanization retarder having an effect of preventing the scorch (called a retarding property) in combination with the vulcanization accelerator.

In the case of the direct vulcanization adhesion method, for example, a sulfenamide-based vulcanization accelerator such as N,N-dicyclohexyl-2-benzothiazolylsulfenamide (hereinafter referred to as DCBS) represented by the following formula (1) is used.

[Chem. 1]

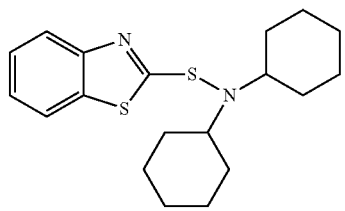

(1)

Examples of known sulfenamide-based vulcanization accelerators other than DCBS include bis(sulfenamide) (see, for example, Patent Document 1), and a benzothiazolylsulfenamide-based vulcanization accelerator (for example, Patent Document 2) for which an amine derived from a natural fat and oil is used as a raw material.

PRIOR ART DOCUMENTS

Patent Documents

Patent Document 1: Japanese Patent Application Publication No. 2005-139082
Patent Document 2: Japanese Patent Application Publication No. 2005-139239

SUMMARY OF THE INVENTION

The conventional direct vulcanization adhesion method in which a vulcanization accelerator and a vulcanization retarder are used has the following problems. Specifically, the vulcanization retarder added to the rubber may deteriorate the physical properties of the rubber after the vulcanization as well as the adhesion between the metal material and the rubber. Moreover, the so-called bleed-out phenomenon may occur in which the vulcanization retarder added to the rubber undergoes change with time, and precipitates on a surface of a rubber product such as an automobile tire, so that the appearance of the product is impaired. In addition, the use of the vulcanization retarder causes a problem of increasing the manufacturing steps and the manufacturing costs of rubber products.

In this respect, an object of the present invention is to provide a rubber composition which is manufactured at an appropriate vulcanization reaction rate without using a vulcanization retarder. Another object of the present invention is to provide, by a direct vulcanization adhesion method, a rubber composite which has excellent adhesion properties between a metal material and a rubber composition, and which allows the number of manufacturing man-hours and the manufacturing costs to be reduced.

In order to solve the above-described problems, the present invention has the following aspects. The gist thereof is a rubber composite (first belt layer 15A, automobile tire 1) comprising: rubber (rubber layer 152); and a metal material (steel cord 151) which has an adhesion boundary surface adhered to the rubber and which reinforce the rubber, wherein the adhesion boundary surface has a crystal structure of an anti-fluorite structure, the rubber is vulcanized by use of a sulfenamide compound as a vulcanization accelerator, a bond order between an amine of the sulfenamide compound and the adhesion boundary surface is zero, the bond order being calculated by use of a semi-empirical molecular orbital calculation method (MOPAC2006), the bond distance between a sulfur atom and a nitrogen atom in the sulfenamide compound is less than 1.67 Å, the bond distance being determined by use of an ab initio molecular orbital calculation method (Gaussian03), and the electric charge on the nitrogen atom of an amine radical generated by dissociation between the sulfur atom and the nitrogen atom of the amine is −0.295 or less.

In the rubber composite according to the first aspect of the present invention, the bond distance between the sulfur atom and the nitrogen atom of the sulfenamide compound is less than 1.67 Å, and the electric charge on the amine radical is −0.295 or less. Hence, the sulfur atom and the nitrogen atom of the amine in the sulfenamide compound are easily dissociated and hardly bonded to each other again.

It has been found that the scorch is influenced by the S—N bond distance of the sulfenamide compound as well as the electric charge on the amine molecules released therefrom. In the rubber composite according to the first aspect of the present invention, the bond distance between the sulfur atom and the nitrogen atom of the sulfenamide compound is less than 1.67 Å, and this bond distance is short. For this reason, the bond between the sulfur atom and the nitrogen atom of the amine is not cleaved easily, so that the vulcanization reaction can be prevented from proceeding before downstream steps. In other words, an effect of preventing the scorch is high. For this reason, for the rubber composite according to the first aspect of the present invention, the scorch can be prevented without adding any vulcanization retarder.

Moreover, in the rubber composite according to the first aspect, the electric charge on the amine radical from the sulfenamide compound is −0.295 or less. As described above, the stability of the dissociated amine radical is high. This makes a once-cleaved S—N bond less likely to be formed again. Accordingly, in the rubber composite according to the first aspect, since a decrease in the reaction sites is not caused by S—N bond reformation, the vulcanization reaction can be caused to proceed smoothly.

Moreover, since no vulcanization retarder is added to the rubber composite according to the present invention, the number of manufacturing man-hours and the manufacturing costs can be reduced. In addition, since no vulcanization retarder is added to the rubber composite according to the present invention, a deterioration in the physical properties of the rubber after the vulcanization can be prevented. Furthermore, since no vulcanization retarder is added to the rubber composite according to the present invention, no bleed-out occurs. Accordingly, a deterioration in the appearance of the rubber composite can be prevented.

A second aspect of the present invention relates to the first aspect of the present invention, and the gist thereof is that the adhesion boundary surface has an adhesive layer formed therein, the adhesive layer containing copper disulfide.

A third aspect of the present invention relates to the second aspect of the invention, and the gist thereof is that the metal material contains at least copper and zinc, and that the percentage of zinc atoms in the metal material is 37.5% or lower.

A fourth aspect of the present invention has the gist that A rubber composition comprising: a sulfenamide compound as a vulcanization accelerator, wherein the bond distance between a sulfur atom and a nitrogen atom in the sulfenamide compound is less than 1.67 Å, the electric charge on nitrogen in an amine radical generated by dissociation between the sulfur atom and the nitrogen atom of the amine is −0.295 or less, and the bond order with an adhesion boundary surface of a metal material having a crystal structure of an anti-fluorite structure is zero.

According to the aspects of the present invention, it is possible to provide a rubber composition of which rate of the vulcanization reaction can be adjusted appropriately without using any vulcanization retarder. It is also possible to provide, by a direct vulcanization adhesion method, a rubber composite which has excellent adhesion properties between a metal material and a rubber composition, and which allows the number of manufacturing man-hours and the manufacturing costs to be reduced.

MODES FOR CARRYING OUT THE INVENTION

In view of the above-described drawbacks of the vulcanization retarders, the inventors have attempted to form a rubber composite without using any vulcanization retarder in a direct vulcanization adhesion method. In comparison with the cases where conventional vulcanization accelerators are used, a rubber composite formed by a novel direct vulcanization adhesion method needs to satisfy the following requirements: (I) having unimpaired adhesion properties to a metal material; and (II) having a better scorch-preventing effect (called a delayed-action properties, or anti-scorch properties) than conventional vulcanization accelerators even when no vulcanization retarder is added.

A description is given of embodiments of a rubber composite and a rubber composition according to the present invention. Specifically, described are (1) the structure of the rubber composite, (2) thermal degradation behaviors on a steel cord/rubber adhesion boundary surface, (3) a method of predicting thermal degradation behaviors of the steel cord/rubber adhesion boundary surface, (4) Examples, (5) operations and effects, and (6) other embodiments.

(1) Structure of Rubber Composite

In this embodiment, the rubber composite is an automobile tire. In an automobile tire, rubber is reinforced with a metal material such as a steel cord. In a step of manufacturing an automobile tire, the vulcanization of the rubber and the adhesive bonding of a steel cord and the rubber are conducted simultaneously in the direct vulcanization adhesion method.

Figure 1:
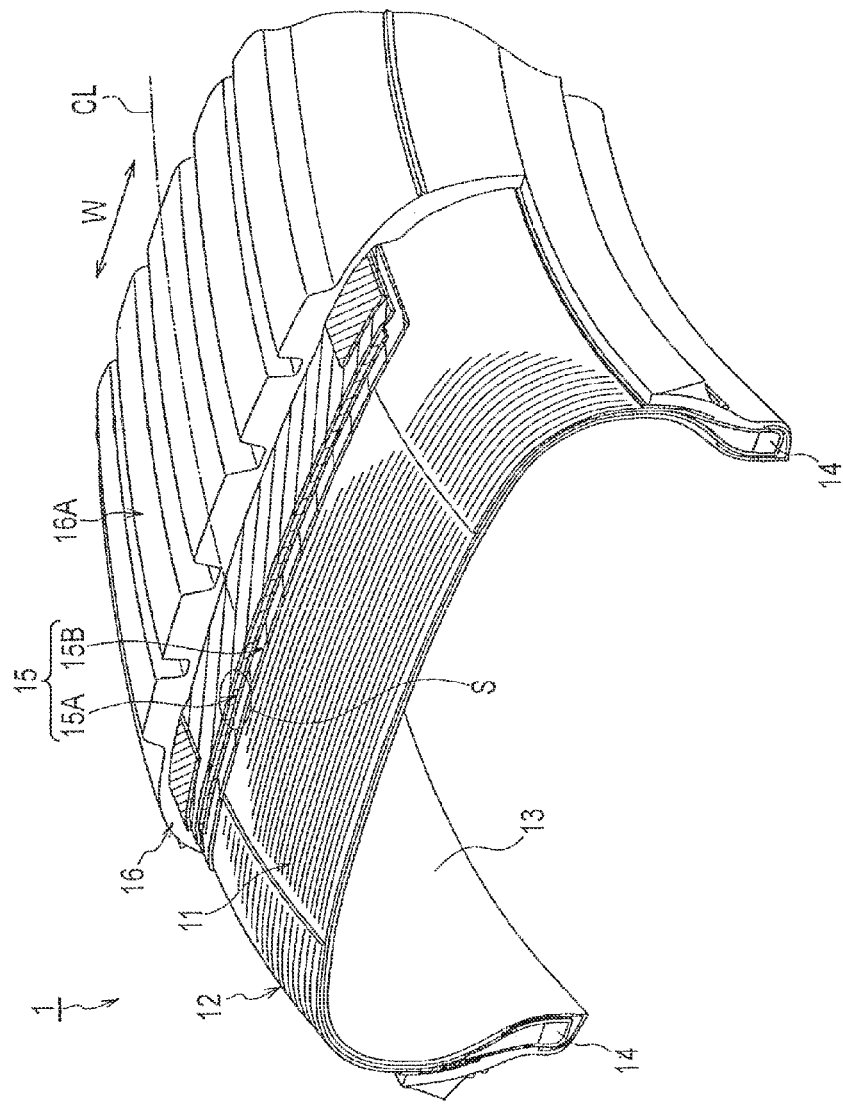
FIG. 1 is a partial perspective view of an automobile tire 1 according to an embodiment of the present invention.

A description is given of the automobile tire according to the present invention with reference to the drawings. FIG. 1 is an exploded perspective view showing apart of an automobile tire 1 according to the present invention. As shown in FIG. 1, the automobile tire 1 has a carcass layer 12 serving as a carcass of the automobile tire 1.

The carcass layer 12 includes carcass cords 11. On the inside of the carcass layer 12 in the radial direction of the tire, an inner liner 13 is provided which is a highly airtight rubber layer corresponding to a tube. Both ends of the carcass layer 12 are locked to a pair of bead portions 14. The carcass cords 11 are formed of steel cords.

On the outside of the carcass layer 12 in the radial direction of the tire, a belt layer 15 is provided. The belt layer 15 has a first belt layer 15A and a second belt layer 15B which have steel cords (to be described later) coated with rubber. The steel cords constituting the first belt layer 15A and the second belt layer 15B are arranged at predetermined angles (for example, ±25 degrees) with respect to the tire equatorial plane CL.

On the outside of the belt layer 15 (the first belt layer 15A and the second belt layer 15B) in the radial direction of the tire, a tread portion 16 configured to come into contact with a road surface is provided. The tread portion 16 has a tread rubber layer 16A.

Figure 2:
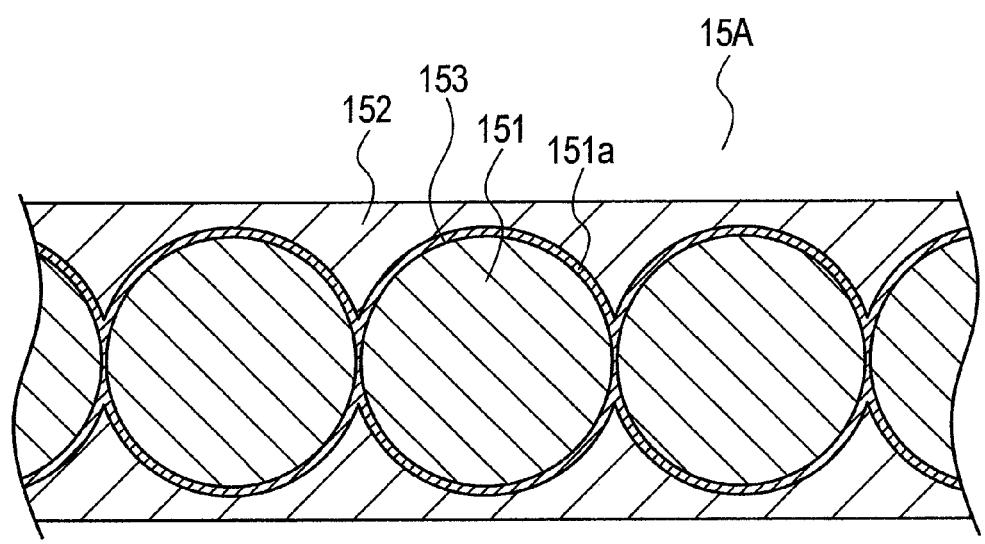
FIG. 2 is an enlarged cross-sectional view in which the region S in FIG. 1 is enlarged.

The carcass cords 11 or the belt layer 15 is a rubber composite in which steel cords are covered with rubber. FIG. 2 is an enlarged view of the region S of the first belt layer 15A in a cross-section in the width direction of the tire and in the radial direction of the tire, the first belt layer 15A being an example of the rubber composite. The first belt layer 15A has steel cords 151 and a rubber layer 152. Each of the steel cords 151 has a steel cord/rubber adhesion boundary surface 151a bonded to the rubber layer 152. In the steel cord/rubber adhesion boundary surface 151a, an adhesive layer 153 is formed. The steel cords 151 reinforce the rubber layer 152. Moreover, the steel cords 151 form the carcass of the automobile tire 1. Here, the steel cords 151 constitute the metal material, whereas the rubber layer 152 constitutes the rubber composition.

(2) Thermal Degradation Behaviors on Steel Cord/Rubber Adhesion Boundary Surface The present inventors have made earnest efforts to elucidate the relationship between the kind of a vulcanization accelerator in the direct vulcanization adhesion method and the thermal degradation of the adhesion boundary surface between a rubber layer and a steel cord. As a result, the present inventors have found that the heat resistance of the steel cord/rubber adhesion boundary surface varies depending on the kind of an amine generated when a sulfenamide-based vulcanization accelerator is decomposed during a vulcanization treatment.

Regarding the degradation of the steel cord/rubber adhesion boundary surface, the amount of Cu dissolved in the rubber was analyzed by use of an ICP (inductively coupled plasma) mass spectrometer, and then the elution of a copper sulfide layer constituting the adhesive layer was determined on the basis of the detected amount.

For example, it have been found that dicyclohexyl amine generated from N,N-dicyclohexyl-2-benzothiazole sulfenamide (DCBS) exerts no effects on the heat resistance of the steel cord/rubber adhesion boundary surface, whereas cyclohexyl amine generated from N-cyclohexyl-2-benzothiazole sulfenamide lowers the heat resistance of the steel cord/rubber adhesion boundary surface.

In addition, it has been found that tert-butylamine generated form N-tert-butyl-2-benzothiazole sulfenamide, and oxydiethyleneamine generated form N-oxydiethylene-2-benzothiazole sulfenamide lower the heat resistance of the steel cord/rubber adhesion boundary surface.

(3) Method for Predicting Thermal Degradation Behaviors of Steel Cord/Rubber Adhesion Boundary Surface The present inventors have found that the heat resistance of the steel cord/rubber adhesion boundary surface is associated with the kind of the amine released from the sulfenamide-based vulcanization accelerator. Therefore, the inventors began an attempt to develop a vulcanization accelerator which does not lower the heat resistance of the steel cord/rubber adhesion boundary surface.

First, regarding a method for predicting the heat resistance of a steel cord/rubber adhesion boundary surface in a rubber composite which has been subjected to vulcanization and adhesive bonding treatments using a certain vulcanization accelerator, the present inventors predicted that the correlation could be understood by calculating the effect of the amine released from the vulcanization accelerator on copper sulfide constituting the steel cord.

Specifically, the following calculations were carried out.
3-1. Calculation of Most Stable Structure of Amine
3-2. Building of Structure Model of Steel Cord/Rubber Adhesion Boundary Surface
3-3. Calculation of Interaction between Surface of Steel Cord and Amine
3-4. Data Analysis
Hereinafter, each calculation is described in details.

3-1. Calculation of Most Stable Structure of Amine

Figure 3:
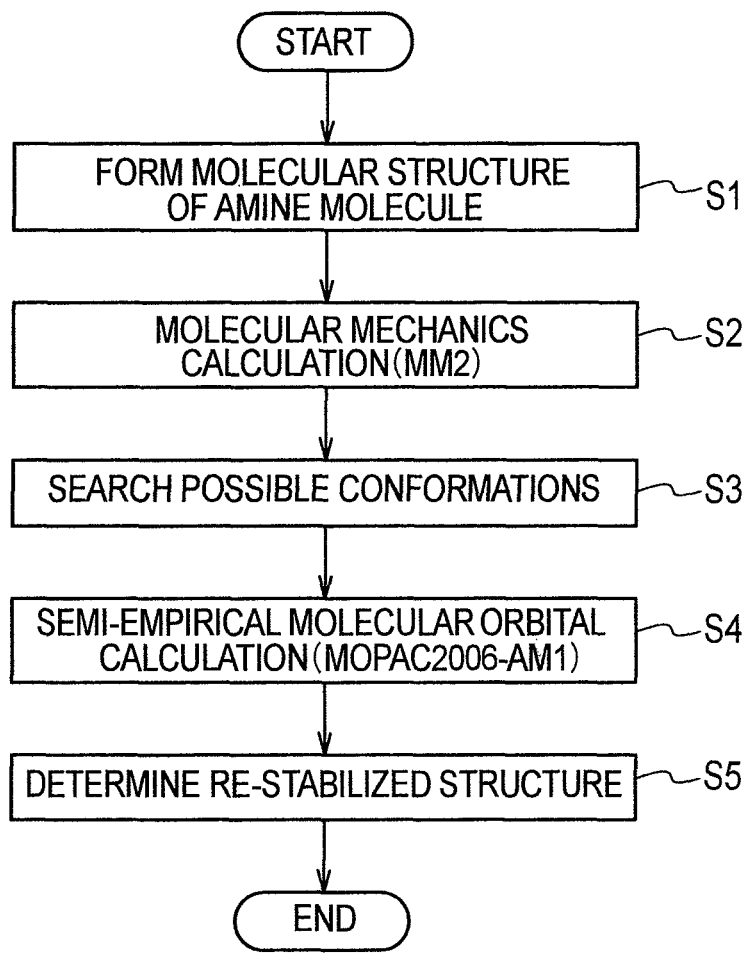
FIG. 3 is a flowchart for describing a process for calculating the most stable structure of an amine released from a vulcanization accelerator.

FIG. 3 shows a flowchart for describing a process for calculating the most stable structure of an amine released from a vulcanization accelerator. In Step S1, a molecular structure of an amine molecule which can actually exist was formed by use of semi-empirical molecular orbital calculation software Scigress Explorer MOPAC 2006 (available from Fujitsu Limited).

In Step S2, a molecular mechanics calculation of the amine molecule drawn in Step S1 was performed to search a stable structure in terms of molecular mechanics. In this embodiment, a molecular force field calculation program (MM2) developed by Allinger was used. Next, in Step S3, rotatable dihedral angles in the molecular structure of the amine were rotated every 10° to search possible conformations of the amine molecule.

Subsequently, in Step S4, semi-empirical molecular orbital calculations were performed for all the conformations found in Step S3. In this embodiment, the AM1 method was used as an operator. In Step S5, the spatial configuration in which the heat of formation was minimized was determined as the most stable structure of the amine molecule.

3-2. Building of Structure Model of Steel Cord/Rubber Adhesion Boundary Surface

Next, a structure model of the steel cord/rubber adhesion boundary surface was built by simulation. Specifically, the copper disulfide (Cu2S) structure, which was actually observed with a transmission electron microscope (TEM), that is, a crystal of the anti-fluorite structure was employed. For the formation of a crystal model, Materials Explorer ver. 5.0 (available from Fujitsu Limited) was used.

Figure 4:
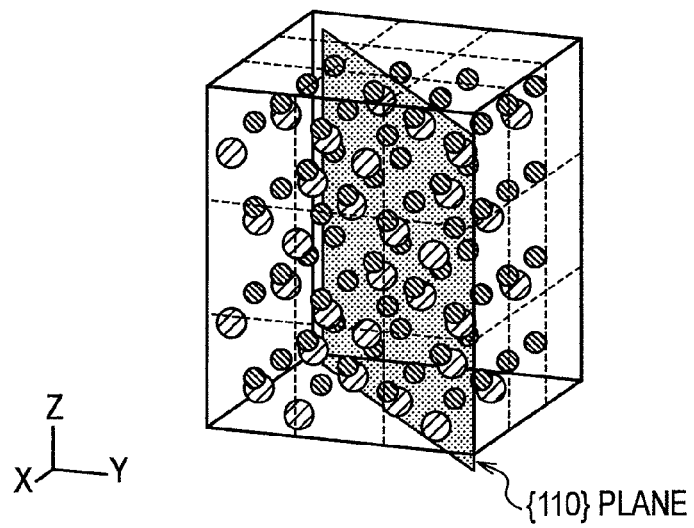
FIG. 4 is a schematic diagram for describing a structure model of a steel cord/rubber adhesion boundary surface.
Figure 4:
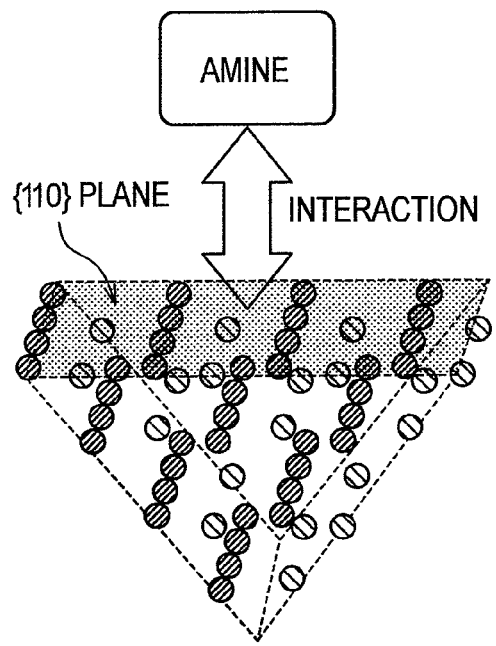

FIG. 4 is a schematic diagram for describing a structure model of the steel cord/rubber adhesion boundary surface. When the steel cord is regarded as an adsorbent, and an amine molecule is regarded as an adsorbate, the adsorbent needs to have a sufficiently large area relative to the size of the amine molecule.

In this respect, employed was a crystal structure of the so-called anti-fluorite-type in which 27 unit cells (three in the longitudinal direction×three in the transverse direction×three in the height direction) of copper sulfide were stacked as shown in FIG. 4(a). The selected crystal is Cu2S of which diffraction pattern detected by nano-beam diffraction using a transmission electron microscope coincided with that described in the JCPDS card. For calculation, a (110) plane on which both Cu and S appeared on a surface in this crystal structure was employed as an adhesion surface layer model. As shown in FIG. 4(b), the amine having the most stable structure determined as above was brought into contact with the adhesion boundary surface to determine the interaction therebetween.

3-3. Calculation of Interaction between Surface of Steel Cord and Amine

The interaction between copper disulfide and the amine molecule was calculated for the case where the amine molecule having the most stable structure was brought close to the (110) plane in a cubic crystal system of copper disulfide, with the Hamiltonian operator PM5 being set in Scigress Explorer MOPAC 2006 (available from Fujitsu Limited). As keywords, EF, XYZ, and PULAY SHIFT=10PL were used.

By the calculation, a state of the steel cord/rubber adhesion boundary surface, i.e., a state of the adsorption of the amine molecule to the (110) plane in the cubic crystal system of copper disulfide can be determined. When an amine molecule adsorbs to the steel cord/rubber adhesion boundary surface, a weak bond is formed between the N atom of the amine and a Cu atom present on the steel cord/rubber adhesion boundary surface. On the other hand, when an amine molecule does not adsorb to the steel cord/rubber adhesion boundary surface at all, no bond is formed between the N atom of the amine and a Cu atom present on the steel cord/rubber adhesion boundary surface. In other words, the bond order is zero.

It has been found that the state of the adsorption of the amine molecule to the (110) plane in the cubic system of copper disulfide has an extremely strong correlation with the heat resistance of the adhesive layer formed in the steel cord/rubber adhesion boundary surface. Specifically, when the amine molecule adsorbs to the (110) plane in the cubic crystal system of copper disulfide (when the bond order is not 0), the heat resistance decreases.

In consideration of the knowledge obtained from the calculation, the cause of the decrease is presumably as follows. When a N atom of the amine adsorbs to a Cu atom on the (110) plane in the cubic crystal system of copper disulfide, the HOMO level of molecular orbitals is concentrated on a S atom adjacent to the Cu atom, so that the reactivity thereof is increased. As a result, the S atom undergoes electrophilic attack by an acid, such as stearic acid, added in a manufacturing step of a rubber product such as the automobile tire 1, so that the Cu2S layer (adhesive layer) collapses.

As described above, a rubber composite manufactured by use of a vulcanization accelerator capable of generating an amine which adsorbs to a Cu atom present in the steel cord/rubber adhesion boundary surface has poor heat resistance. In contrast, it has been discovered that a rubber composite manufactured by use of a vulcanization accelerator capable of generating an amine which does not adsorb to a Cu atom present in a steel cord/rubber adhesion boundary surface has good heat resistance.

3-4. Analysis

As described above, it has been suggested that a rubber composite having good heat resistance can be developed by designing a sulfenamide-based vulcanization accelerator while taking characteristics of the amine molecule generated form the sulfenamide-based vulcanization accelerator into consideration.

Meanwhile, although the presence of the effect of increasing the rate of the vulcanization reaction is advantageous in terms of the original role of the vulcanization accelerator, an excessively fast rate causes adverse effects such as the progress of vulcanization during storage. The inventors used an ab initio molecular orbital method to investigate a correlation between scorch and the bond distance between a S atom and a N atom in an amine moiety of a sulfenamide-based vulcanization accelerator. As a result, it has been found that the scorch is influenced by the electric charge on the amine molecule released from the sulfenamide compound.

Specifically, it has been revealed that the longer the distance of the S—N bond which dissociates during the vulcanization reaction is, in other words, the more easily the S atom and the N atom dissociate from each other, the more easily the scorch occurs. Particularly, it has been found that if the bond distance is 1.67 Å or longer, the scorch occurs markedly.

Meanwhile, even when the bond distance between the S atom and the N atom is less than 1.67 Å, and the bond between the S atom and the N atom is not easily cleaved (not easily dissociated), if the stability of an amine radical generated as a result of dissociation is low, there are some cases where the S atom and the N atom are bonded to each other again, so that the vulcanization reaction is not accelerated. In this respect, the electric charge at the N position of the amine radical was determined as an index for achieving the stability of the amine radical.

First, an optimization calculation was conducted by use of the basis function B3LYP/6-31G (2df, p) of Gaussian 03 to determine the bond distance between a S atom and a N atom in a sulfenamide. Then, a single point calculation method was performed by use of the basis function ROMP2/G3MP2large. Moreover, the electric charge density analysis was performed by NBO analysis to determine the electric charge density at the N position of the amine radical. As a result, it was found that an appropriate vulcanization reaction can be caused when a sulfenamide-based vulcanization accelerator whose electric charge density at the N position of the amine radical is −0.295 or lower.

Moreover, a carbon atom bonded to a nitrogen atom in the amine preferably has a branched structure. When a carbon atom bonded to the nitrogen atom in the amine has a branched structure, the nitrogen atom in the amine easily takes on a negative charge. For this reason, the bond between the nitrogen atom and the sulfur atom bonded to the nitrogen atom becomes relatively short, so that the bond between the N and S atoms are hardly cleaved. Presumably as a result of this, an effect of appropriately preventing the scorch can be obtained.

On the other hand, when none of the carbon atoms bonded to the nitrogen atom in an amine has any branched structure, the nitrogen atom is less likely to take on a negative charge. Presumably for this reason, the bond between the N and S atoms is easily cleaved, so that the scorch proceeds more easily.

In addition, a tert-butyl group is preferably bonded to the nitrogen atom in the amine. A tert-butyl group has a large steric hindrance. For this reason, even a low-molecular-weight amine has a large effect of making it less likely for the amine radical to be bonded to the surface of a Cu atom present in the steel cord/rubber adhesion boundary. In other words, properties against thermal degradation can be improved.

If one of the carbon atoms bonded to the nitrogen atom in the amine has a branched structure, the reaction rate of the vulcanization reaction can be maintained at an appropriate level. Hence, such a case is more preferable. Moreover, when one of the carbon atoms bonded to the nitrogen atom in the amine has a branched structure whereas the other one has a linear structure, an effect of making it more difficult to prevent the amine from being bonded to the surface of the metal material and the effect of maintaining the reaction rate of the vulcanization reaction at an appropriate level can be achieved at the same time. Hence, such a case is extremely preferable.

As described above, it has been found that when a sulfenamide-based vulcanization accelerator is used for a rubber composite using a sulfenamide compound as a vulcanization accelerator, the adhesion properties of the steel cord/rubber adhesion boundary surface and the anti-scorch properties can be achieved simultaneously, the sulfenamide-based vulcanization accelerator being such that the bond order between an amine generated form the sulfenamide compound and a surface of a metal material is zero, and the distance of the S—N (amine moiety) bond of the sulfenamide compound is less than 1.67 Å, and the electric charge on N of the amine radical generated as a result of dissociation of the S—N bond is −0.295 or less.

(4) Examples

Table 1 shows a list of the structures of various sulfenamide-based vulcanization accelerators newly contrived as a result of calculations based on 3-1 to 3-4, as well as scorch properties and adhesion properties thereof. For Comparative Example, a sample was prepared by adding N-(cyclohexylthio)phthalimide (CTP) as a vulcanization retarder to N,N- dicyclohexyl-2-benzothiazolylsulfenamide (hereinafter referred to as DCBS) represented by the chemical formula (1), so that the scorch properties were adjusted to a favorable value.

For Examples 1 to 3, samples were prepared by use of vulcanization accelerators which were determined from the calculations described in above-described 3-1. Calculation of Most Stable Structure of Amine, 3-2. Building of Structure Model of Steel Cord/Rubber Adhesion Boundary Surface, 3-3. Calculation of Interaction between Surface of Steel Cord and Amine, and 3-4. Analysis, and which are represented by the chemical formulas (2) to (4). Specifically, the vulcanization accelerator used in Example 1 was N-ethyl-N-t-butyl-benzothiazole-2-sulfenamide.

[Chem. 2]

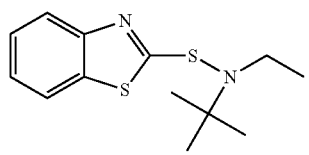 [SMILES: CCN(Sc1nc2ccccc2s1)C(C)(C)C]

(2)

The vulcanization accelerator used in Example 2 was N-butyl-N-t-butyl-benzothiazole-2-sulfenamide.

[Chem. 3]

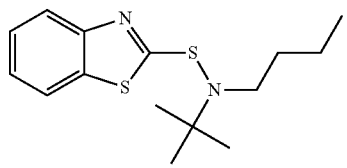 [SMILES: CCCCN(Sc1nc2ccccc2s1)C(C)(C)C]

(3)

The vulcanization accelerator used in Example 3 was N-cyclohexyl-N-t-butyl-benzothiazole-2-sulfenamide.

[Chem. 4]

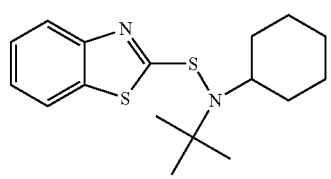

(4)

Scorch properties and adhesion properties were evaluated for Comparative Example and Examples 1 to 3 in the following procedure.

Table 1 shows the S—N (amine moiety) bond distance of each sulfenamide compound, which was a vulcanization accelerator, and the electric charge on N of the amine radical.

TABLE 1

| Vulcanization accelerator | Structural formula | Bond order | S—N bond distance | Electric charge on N |
|---|---|---|---|---|
| Example 1 | | 0 | 1.666 | −0.301 |
| Example 2 | | 0 | 1.658 | −0.295 |
| Example 3 | | 0 | 1.66 | −0.295 |
| Comparative Example 1 | | 0 | 1.659 | −0.282 |

4-1. Evaluations of Mooney Viscosity and Mooney Scorch Time

These were carried out in accordance with JIS K6300-1: 2001. Evaluations are shown as relative values with the value for Comparative Example 1 being taken as 100. A larger numeric value indicates better anti-scorch properties.

4-2. Evaluation of Adhesive Properties

Three steel cords (outer diameter 0.5 mm×length 300 mm) which were brass plated (Cu: 63 wt %, Zu: 37 wt %: the so-called α-brass) were arranged in parallel to each other at intervals of 10 mm. Then, these steel cords were coated with a rubber composition coating from above and below. Moreover, vulcanization was performed under conditions of 160° C. and 20 minutes. Thus, a sample was prepared. The adhesion properties of the obtained sample were evaluated. Specifically, based on a method according to ASTM-D-2229, the steel cords were pulled out from the sample, and the state of the coating of the rubber was visually observed, and rated on a scale from 0 to 100%. For heat resistant adhesion properties, each sample was left in a Geer oven at 100° C. for 15 days. Then, based on a method according to ASTM-D-2229, the steel cords were pulled out from the sample, and the state of the coating of the rubber was visually observed. The evaluation is shown as a relative value with the value of Comparative Example 1 taken as 100. A higher numeric value indicates superior heat resistance.

TABLE 2

|  | Heat resistant adhesion properties Deterioration in 15 days | Scorch properties |
|---|---|---|
| Example 1 | 133 | 101 |
| Example 2 | 135 | 102 |
| Example 3 | 133 | 103 |
| Example 4 | 100 | 100 |

As described above, the samples fabricated by use of the sulfenamide-based vulcanization accelerators newly contrived as a result of calculations based on 3-1 to 3-4 had better scorch properties and adhesion properties than those of the conventional one for which the rate of the vulcanization reaction was adjusted by use of the vulcanization retarder.

(5) Operations and Effects

The automobile tire 1 is formed as a rubber composite in a direct vulcanization adhesion method by vulcanization of the rubber layer 152 as well as adhesive bonding of the rubber layer 152 and the steel cords 151 to each other. At this time, a sulfenamide compound is used as a vulcanization accelerator, and the bond order between the amine of the sulfenamide compound and the adhesion boundary surface 151a is zero. In addition, the distance of the S—N bond in the sulfenamide compound, i.e., the distance of the bond between the sulfur atom and the nitrogen atom bonded to each other is less than 1.67 Å, and the electric charge on the nitrogen in the amine radical generated through dissociation between the sulfur atom and the nitrogen atom of the amine is −0.295 or less.

It has been found that the scorch is influenced by the electric charge on the amine molecule released from the sulfenamide compound. In the automobile tire 1 of this embodiment, the bond distance between the sulfur atom and the nitrogen atom of the sulfenamide compound is less than 1.67 Å, and the bond distance is short. For this reason, the bond between the sulfur atom and the nitrogen atom of the amine is not cleaved easily, and therefore the vulcanization reaction can be prevented from proceeding before the vulcanization step.

In addition, in the automobile tire 1, the electric charge on the amine radical of the sulfenamide compound is −0.295 or less. Thus, the stability of the dissociated amine radical is high. This reduces the possibility of reformation of the once-cleaved S—N bonds. Accordingly, in the automobile tire 1, the decrease in the reaction sites due to the S—N bond reformation does not occur, so that the vulcanization reaction can be caused to proceed smoothly.

In addition, since the automobile tire 1 does not require any vulcanization retarder, the number of manufacturing man-hours and the manufacturing costs can be reduced. In addition, since the automobile tire 1 does not require any vulcanization retarder, a deterioration in the physical properties of the rubber after the vulcanization can be prevented. Furthermore, since the automobile tire 1 does not require any vulcanization retarder, no bleed-out of additives occurs on a surface of a product. As a result, a deterioration in the appearance of the automobile tire 1 can be prevented.

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art. For example, the embodiment of the present invention can be modified as follows.

In the embodiment of the present invention, the carcass cords 11 or the belt layer 15 of the automobile tire 1 is described as an example of the rubber composite. However, the rubber composite is not limited to the carcass cords 11 or the belt layer 15. For example, the rubber composite may be formed of the carcass cords 11 and the inner liner 13.

As described above, the present invention naturally includes various embodiments which are not described herein. Accordingly, the technical scope of the present invention should be determined only by the matters to define the invention in the scope of claims regarded as appropriate based on the description.

Note that the entire contents of Japanese Patent Application No. 2009-152722 (filed on Jun. 26, 2009) are incorporated herein by reference.

INDUSTRIAL APPLICABILITY

The rubber composite and the rubber composition according to the present invention are applicable to rubber products, such as automobile tires, conveyor belts, and hoses, which are reinforced with metal materials such as steel cords.

EXPLANATION OF REFERENCE NUMERALS

| 1 | automobile tire, |
|---|---|
| 11 | carcass cord, |
| 12 | carcass layer, |
| 13 | inner liner, |
| 14 | bead portion, |
| 15 | belt layer, |
| 15A | first belt layer, |
| 15B | second belt layer, |
| 16 | tread portion, |
| 151 | steel cord, |
| 151a | steel cord/rubber adhesion boundary surface |
| 152 | rubber layer |

The invention claimed is:

1. A rubber composite comprising:
   rubber; and
   a metal material which has an adhesion boundary surface adhered to the rubber and which reinforces the rubber, wherein
   the adhesion boundary surface has a crystal structure of an anti-fluorite structure,
   the rubber is vulcanized by use of a sulfenamide compound as a vulcanization accelerator,
   a bond order between an amine of the sulfenamide compound and the adhesion boundary surface is zero, the bond order being calculated by use of an AM1 method as a semi-empirical molecular orbital calculation method,
   the bond distance between a sulfur atom and a nitrogen atom in the sulfenamide is less than 1.67 Å, the bond distance being determined by use of a basis function B3LYP/6-31G (2df, p) as an ab initio molecular orbital calculation method, and
   the electric charge on nitrogen of an amine radical generated by dissociation between the sulfur atom and the nitrogen atom of the amine is −0.295 or less, the electric charge being determined by calculating molecular orbitals of an amine radical with a basis function ROMP2/G3MP2large, and then performing an NBO analysis on the molecular orbitals.

2. The rubber composite according to claim 1, wherein the adhesion boundary surface has an adhesive layer formed therein, the adhesive layer containing copper disulfide.

3. The rubber composite according to claim 1, wherein the metal material contains at least copper and zinc, and the percentage of zinc atoms in the metal material is 37.5% or lower.

* * * * *